Patented Aug. 14, 1934

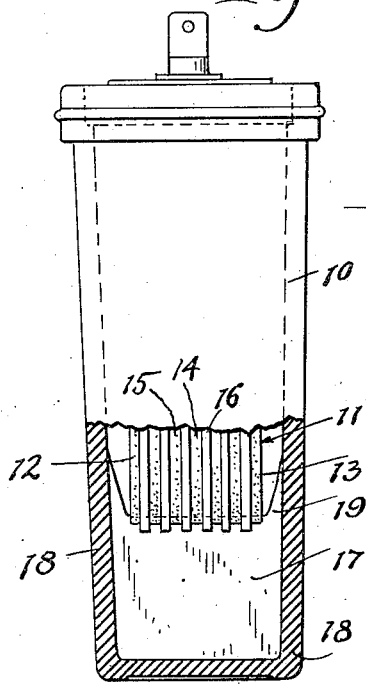
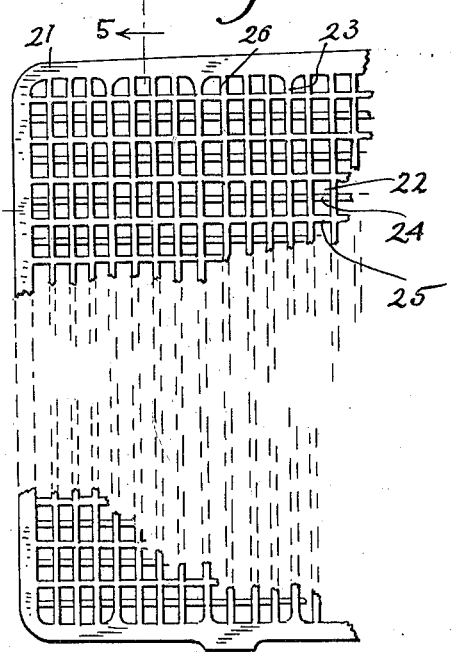
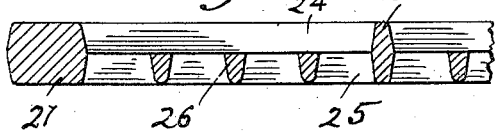
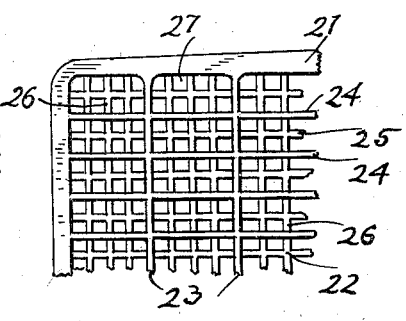
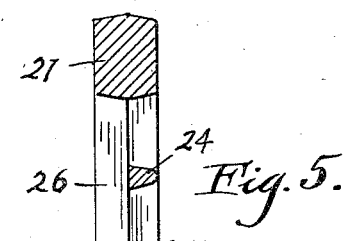

1,970,189

UNITED STATES PATENT OFFICE 1,970,189

STORAGE BATTERY ELEMENT

Willard L. Reinhardt, East Cleveland, Ohio, assignor to Willard Storage Battery Company, Cleveland, Ohio, a corporation of West Virginia Application December 1, 1930, Serial No. 499,155

2 Claims. (Cl. 136—48)

This invention relates to storage batteries and more particularly to an improved form of storage battery element.

Heretofore in the storage battery art the problem of constructing a battery element so that the active material of the plates will be readily accessible to the electrolyte and at the same time will be retained in place throughout the life of the battery, has received considerable attention. In the type of battery most commonly used today the separators engaging the faces of the plates are relied upon to a large extent for retaining the active material in place, but in certain types of batteries, particularly those having containers formed by molding material such as glass, it is not practicable to provide for holding a separator against the outer face of the end plates, with the result that these end plates are subject to rapid deterioration by reason of the active material falling out.

It is therefore an object of this invention to provide a storage battery element in which the end plates have means on their exposed sides for preventing the active material from falling out.

Another object of this invention is to provide a novel form of storage battery grid.

The invention may be further briefly summarized as consisting in certain novel combinations and arrangements of parts hereinafter described and particularly set out in the appended claims.

In the accompanying sheet of drawings:—

Figure 1 is an elevational view of a storage battery partly in section and showing the battery element in place in the container.

Fig. 2 is a plan view of a grid for an end plate of the element illustrating the form of the grid on the side thereof corresponding with the exposed or outer side of the plate.

Fig. 3 is a plan view showing the side of the grid corresponding with the inner or separator side of an end plate.

Fig. 4 is an enlarged sectional view taken on line 4—4 of Fig. 2; and

Fig. 5 is an enlarged sectional view taken on the line 5—5 of Fig. 2.

In Fig. 1 of the drawing I have shown a storage battery of the type mentioned above comprising a container 10 formed of molded material, and a battery element 11 embodying my invention assembled therein. This battery element with the exception of the extreme end plates 12 and 13 is of the usual form comprising positive and negative plates 14 and 15 nested together with separators 16 of suitable material interposed therebetween.

The battery element is supported in place within the container by providing the latter with a suitable number of bottom rests 17 in the form of integral ribs which extend transversely between the side walls 18. These bottom rests are usually formed with integral tapered portions 19 which extend upwardly along the side walls 18 for a short distance above the top edges of the rests. The container being constructed from molded material, as mentioned above, is formed with the side walls 18 slightly inclined away from each other as shown in Fig. 1 so as to permit the separation of the container from the mold which forms the same.

When the battery element is assembled in place in a container of this type the extreme end plates 12 and 13 are normally spaced somewhat from the walls of the container as shown in Fig. 1. This spacing of the end plates with respect to the side walls of the container, as well as the inclination of the side walls and the provision of the tapered extensions 19, prevents the use of separators against the outer or exposed faces of the end plates 12 and 13 for preventing the active material from falling out of these plates.

To prevent rapid deterioration of these plates by reason of the active material falling out of the same, I have devised the novel form of grid for these end plates which is shown in Figs. 2 to 5 inclusive. This grid is formed of cast-lead and comprises a continuous outer rim portion 21 which encloses a mesh or grille portion 22. This grille portion is formed by providing vertical main ribs 23 which are spaced relatively far apart and a plurality of horizontally extending ribs 24 and 25 spaced relatively close together. The vertical main ribs 23 are of substantially the same thickness as the outer rim portion 21, but the horizontally extending ribs 24 and 25 are approximately only half the thickness of the main ribs 23. As shown in Fig. 5 the horizontal ribs 24 constitute a series or set of ribs lying in one plane while the horizontally extending ribs 25 constitute a similar set lying in another plane. The backs of all the ribs 24 and 25 lie in substantially the same plane which is the central plane of the grid. This arrangement of horizontally extending ribs produces a staggered effect, as shown in Fig. 5, in which the ribs 24 alternate with the ribs 25.

The grid as thus far described is identical with the grid which is used in making all of the plates of the element 11 with the exception of the extreme end plates 12 and 13. For these end plates I find it necessary to provide means on their outer or exposed sides for preventing the active material from falling out. The means which I have devised consists in the provision of one or more vertical ribs 26 interposed between the vertical main ribs 23. These additional ribs are made of substantially half the thickness of the vertical main ribs and lie in the same plane as the horizontally extending ribs 25. These vertical ribs 26 connect the horizontal ribs 25 and being of substantially the same thickness as the latter ribs, their backs lie in the central plane of the grid and are integrally connected with the backs of the ribs 24.

The side of the grid illustrated in Fig. 2 is the side which corresponds with the outer or exposed side of the end plates 12 and 13, and as shown in this figure, the outside of the grid has the appearance of a substantially smooth or continuous grille. The side of the grid illustrated in Fig. 3 is the side which corresponds with the inside or separator side of the plates 12 and 13, and appears to have a plurality of pockets 27 formed between each pair of horizontal ribs 24 and each pair of vertical ribs 23. These pockets are open on one side and are closed on the other side by a lattice formed by the intersecting horizontal and vertical ribs 25 and 26. After the active material has been applied to the grid and the plate thus formed is assembled in the battery, the lattice like closures of the pockets are on the outer or exposed sides of the end plates 11 and 12 and effectively retain the active material in place and at the same time permit free access of the electrolyte.

It will now be readily seen that I have provided an improved form of battery element in which the end plates thereof are provided with means on their exposed or outer sides for preventing the active material from falling out. It will also be readily seen that I have provided a novel and efficient form of battery grid so formed that the active material will be retained in place in the end plates of an element throughout the life of the battery and without the need of pressing retaining plates or members against the outer or exposed faces of these plates.

While I have illustrated and described the device of my invention in a detailed manner it should be understood however that I do not intend to limit myself to the precise details and arrangements of structure, but regard my invention as including such changes and modifications as do not involve a departure from the spirit of the invention and the scope of the appended claims.

Having thus described my invention I claim:

1. A storage battery grid comprising a marginal frame, a plurality of spaced vertical main ribs connected to said frame and having opposite faces thereof lying respectively in substantially the same planes as the opposite faces of said frame, two sets of spaced horizontal ribs connected to said frame, one set being on one side of the grid and the other set being on the other side of the grid, said sets of horizontal ribs being such that the outer faces thereof lie respectively in substantially the same planes as the faces of said frame and the inner faces thereof lie in a plane which is substantially the central plane of the grid, said main ribs and one of said sets of horizontal ribs cooperating to form pockets on said one side of the grid, and vertical secondary ribs disposed intermediate the vertical main ribs and intersecting the set of horizontal ribs on said other side of the grid, said vertical secondary ribs being more numerous than the main ribs and being disposed with inner and outer faces thereof lying respectively in substantially the same planes as the inner and outer faces of the last mentioned set of horizontal ribs, said secondary ribs and said last mentioned set of horizontal ribs cooperating to form a grille on said other side of the grid for said pockets.

2. A storage battery grid comprising a marginal frame, a plurality of spaced main ribs connected to said frame, two sets of substantially parallel spaced ribs intersecting said main ribs at substantially right angles, the ribs of one set being on one side of the grid and the ribs of the other set being on the other side of the grid and in offset relation to the ribs of said one set, the ribs of said two sets being of substantially one-half the thickness of said main ribs and being disposed with their outer faces lying respectively in substantially the same planes as the outer faces of said main ribs and with their inner faces lying in a plane which is substantially the central plane of the grid, and other ribs disposed intermediate the spaced main ribs and intersecting the ribs constituting one of said two sets, said other ribs being more numerous than the main ribs and being of substantially one-half the thickness of said main ribs and having their outer and inner faces lying respectively in substantially the same planes as the outer and inner faces of the ribs of said one set, the main ribs and the ribs of the other of said two sets cooperating to form pockets on said one side of the grid, and said more numerous other ribs and the ribs of said one set cooperating to form a grille on said other side of the grid for said pockets.

WILLARD L. REINHARDT.